June 27, 1950     C. H. WOODCOCK ET AL     2,512,986

TUBE GAUGE

Filed June 19, 1946     2 Sheets-Sheet 1

Attest
Robert T. Staples
Andrew T. Zodl

Inventors
Charles H. Woodcock
William H. Stinger
BY Norbert E. Birch
Their Attorney

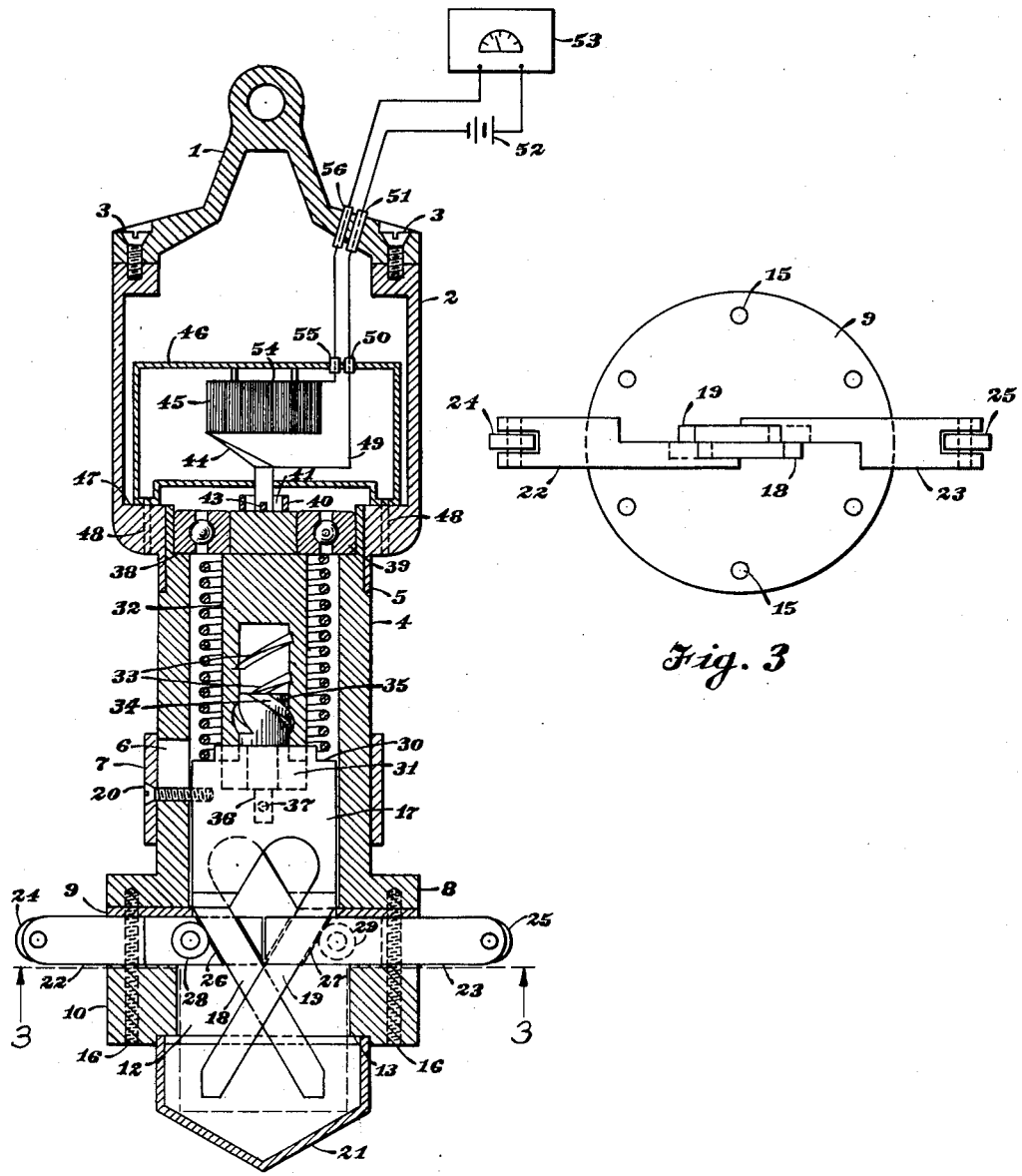

Patented June 27, 1950

2,512,986

UNITED STATES PATENT OFFICE 2,512,986

TUBE GAUGE

Charles H. Woodcock, Philadelphia, and William H. Stinger, Folcroft, Pa., assignors to The Atlantic Refining Company, Philadelphia, Pa., a corporation of Pennsylvania Application June 19, 1946, Serial No. 677,836

3 Claims. (Cl. 33—178)

1

The invention relates to improvements in devices designed to measure the internal diameter of tubes, pipes, and the like. Such device is further adapted for the accurate determination of the bore of any hole or opening.

In certain industries, such as petroleum refining and chemical production, the processes employed frequently require the use of apparatus involving tubular heating elements. Where such elements are used, for example, in connection with oil heating and cracking, the walls thereof are reduced internally by the action of heat and corrosive matter present in the fluids that pass through the tube. It is, therefore, vitally important that means be available whereby the internal dimension of the tube can accurately be measured to detect such reduction in wall structure, not only to prevent disastrous blowouts but also to obtain maximum use of a member before replacement thereof.

Furthermore, because of its use in workshops, refineries and similar places in which it will be subjected to rough treatment, hard usage, and extremes of temperature, a gage to be practical must be of rugged construction and adapted to withstand such treatment and conditions without loss of accuracy. It should also be designed to obtain accurate results even though handled by relatively unskilled labor.

A great problem in connection with the use of such gages as have heretofore been known has arisen in the petroleum industry in the measurement of the bores of long, vertically disposed, tubes or pipes such as the vertical furnace tubes of a De Florez still. In an attempt to solve this problem, sections have been added to conventional gages in an effort to elongate such gages to the length necessary to measure the bore of the entire tube. Such attempts, however, have met with difficulty in transmission of motion from the gage head to the indicator largely due to excess friction or sagging of the extension. Furthermore, these attempts have been unable to overcome such practical difficulties as size, weight, and unwieldiness of the elongated gage. In the present invention, such difficulties have been overcome by freeing the indicator from the limitations inherent in the gage when such indicator is mechanically coupled with the gaging mechanism itself.

One of the objects of the invention, therefore, is to provide means for obtaining an accurate measurement of the internal dimensions of tubes or the like, such measurement being shown remotely from the gage itself by electric means indicating diametric measurement Another object of the invention is to provide a tube gage containing means whereby longitudinal movement of one element can be translated into rotation of another element, such rotation being proportional to such longitudinal movement.

Another object of the invention is to provide means for obtaining an accurate measurement of the internal diameter of a tube, said means being of sufficiently rugged construction to withstand rough treatment and adapted to work efficiently even when operated by relatively unskilled labor.

Other objects of the invention will readily be apparent from the description and claims which follow.

In the drawings like numerals are used to designate like parts.

Figure 2 is a view of the device partially in cross section.

Figures 1, 4, 5, 6, 7:
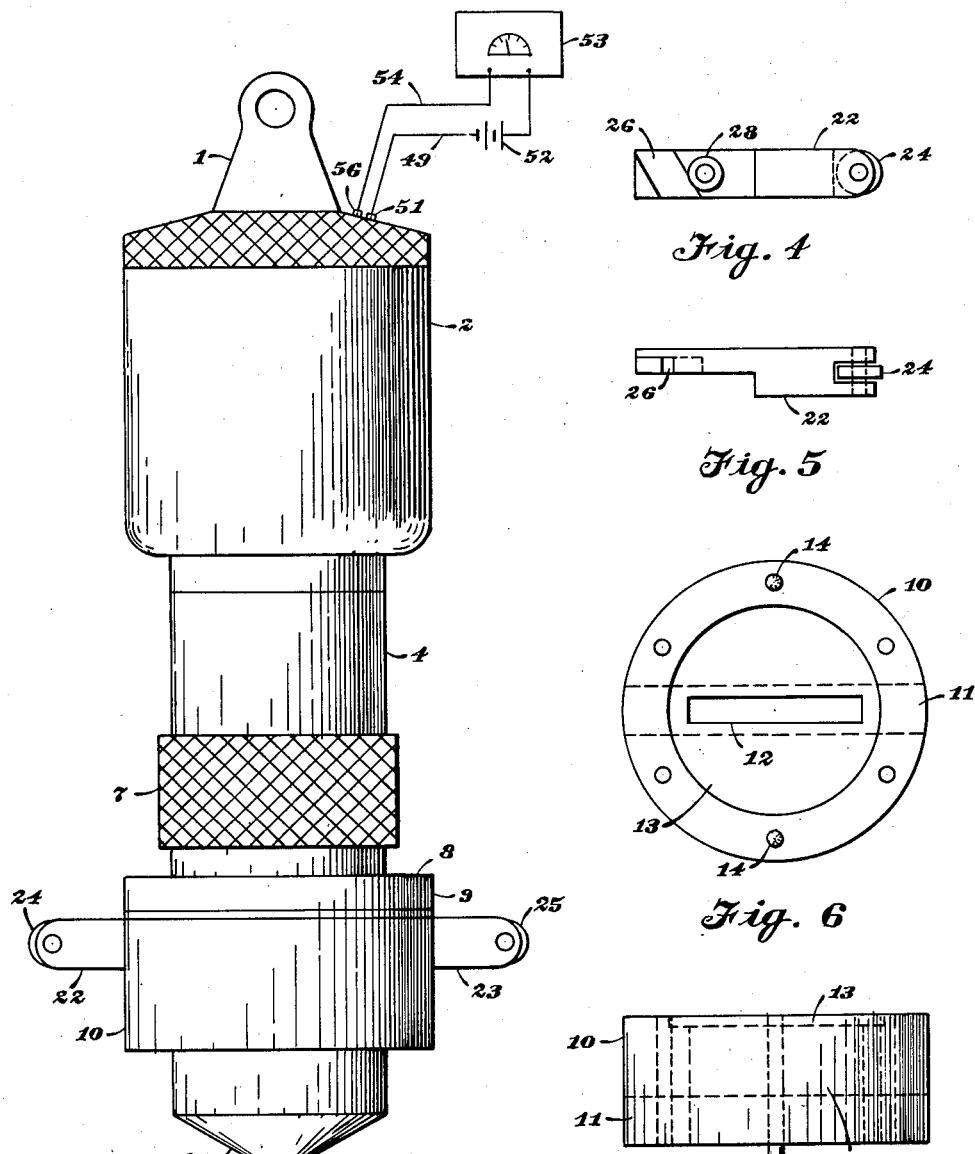
Figure 1 is an elevational view exemplifying the device.

Figure 3 is an end view of the device taken along the line 3—3 of Figure 2, the elements 10, 16, and 21 being removed.

Figure 4 is a side elevational view of the gage pin designated as 22 in Figure 2.

Figure 5 is a top view of Figure 4.

Figure 6 is an end view of the housing designated as 10 in Figure 2.

Figure 7 is a side elevational view of Figure 6.

In Figures 1 and 2 is shown a casing, comprising cap member 1 affixed to body member 2 by bolts 3, or by other suitable means. One end of flanged element 4 is frictionally held within body member 2 as at 5. Flanged element 4 is provided with a longitudinal slot formed therein as at 6. Sleeve 7 is slidably mounted on flanged element 4 relative to such slot. External flange 8 is formed on one end of flanged element 4 and has apertured plate 9 disposed adjacent thereto. Adjoining plate 9 is positioned a housing 10 provided with a transverse channel 11, aperture 12, and recess 13. Dowel pins 14 provided on housing 10 extend through corresponding holes 15 in apertured plate 9 and flange 8. Housing 10, apertured plate 9 and flange 8 are fastened together by bolts 16, or by other suitable means.

Slidably disposed within flanged element 4 is operating rod 17 upon the end of which rod are provided a pair of diagonally crossed plungers 18 and 19, the function of which will be described hereinafter. Operating rod 17 is connected to sleeve 7 by bolt 20, or by other suitable means, such means extending freely through longitudinal slot 6 in the wall of flanged element 4. Diagonally crossed plungers 18 and 19 are adapted to extend through apertured plate 9 and aperture 12 in housing 10. A hollow cap member 21 is frictionally fitted into recess 13 in outer face of housing 10.

Channel 11 extending transversely across the inner face of housing 10, in conjunction with apertured plate 9, forms a passageway wherein are positioned gage pins 22 and 23. The outer ends of such gage pins project externally of housing 10 at diametrically opposed points thereof and are provided with rollers 24 and 25 respectively, which are adapted to make contact with the inner wall of the tube to be measured. Formed adjacent the inner ends of the gage pins are diagonal grooves, 26 and 27 respectively, such grooves being adapted to receive diagonally crossed plungers 18 and 19 respectively extending from operating rod 17, and slidably connect gage pins 22 and 23 with said operating rod so as to transmit any movement of the operating rod to the gage pins thereby resulting in an extension or withdrawal of such gage pins with respect to housing 10. In like manner, any motion of the gage pins as a result of any external force tending to compel said gage pins to retreat within housing 10 will be transmitted through the groove-plunger arrangement and force the withdrawal of operating rod 17 within flanged element 4. Bearings 28 and 29 provided on gage pins 22 and 23 respectively adjacent the edges of grooves 26 and 27 respectively are adapted to prevent binding as plungers 18 and 19 move slidably in such grooves.

The inner end of operating rod 17 is provided with external shoulder 30 and is recessed as at 31 to permit the insertion of hollow cylinder 32, such hollow cylinder having formed therewithin a plurality of internal spiral grooves 33. Coacting with such grooves are a plurality of spiral projections 34 provided on the head of a spindle 35, the lower end of which is affixed to operating rod 17 within recess 31 as at 36 by set screw 37, or by other suitable means.

Internal seat 38 in flanged element 4 supports ball race 39 in which is rotatably journaled hollow cylinder 32, such cylinder being provided at its upper end with circular projection 40 recessed as at 41. Compressed coil spring 42 is disposed within flanged member 4 between external shoulder 30 on operating rod 17, and ball race 38. Such coil spring is adapted to apply continuous pressure to operating rod 17 to urge gage pins 22 and 23 to their extended position. Positioned within recess 41 and keyed thereto as at 43 is contact arm 44 adapted to rotate with hollow cylinder 32 and to contact resistance 45, which resistance may comprise a hollow spool wound with resistance wire, the lower surface of the winding being uninsulated for contact with arm 44.

The upper portion of contact arm 44 and resistance 45 are disposed within housing 46 positioned on internal seat 47 in body member 2 and affixed to such body member by bolts 48, or by other suitable means. Wire 49 is connected with resistance arm 44 and, passing through insulator 50 in housing 46 and insulator 51 in cap member 1, is connected with a source of electric power such as a battery 52. Battery 52 is, in turn, connected to current flow indicating means 53, such as a millivolt meter, which may be calibrated directly in units conventionally designating internal diameter. A second wire 54 is connected to resistance 45, passes through insulator 55 in housing 46 and insulator 56 in cap member 1, and is connected to current flow indicating means 53 thus completing the circuit.

The operation of the device is as follows:

Sleeve 7 slidably mounted on flanged element 4 is retracted, thereby drawing operating rod 17 in the same direction against the pressure exerted by compressed coil spring 42 due to the action of bolt 30 connecting sleeve 7 and operating rod 17 through slot 6. Coincidental with this movement, diagonally crossed plungers 18 and 19 slidably positioned in grooves 26 and 27 formed in gage pins 22 and 23 respectively, retract said gage pins into housing 10, thus facilitating the insertion of the end of the device into the tube, the internal diameter of which it is desired to measure.

After insertion of the device into the tube, sleeve 7 is released and, under the compulsion of compressed coil spring 42, operating rod 17 slides forward relative to flanged element 4. As a result of the movement of such operating rod acting through plungers 18 and 19 and diagonal grooves 26 and 27 in gage pins 22 and 23 respectively, said gage pins are projected outwardly through transverse channel 11 in housing 10 until rollers 24 and 25 make contact with the wall of the tube.

The gage is then lowered into the tube by a cable (not shown) attached by any suitable means to cap member 1, and a continuous measurement can be obtained during its passage therethrough. During the measuring process, any variation in internal diameter will be transmitted by gage pins 22 and 23 to crossed plungers 18 and 19, respectively, thereby actuating operating rod 17 in a longitudinal direction within flanged element 4. Due to the movement of operating rod 17, spindle 35 moves within hollow cylinder 32. As a result of the coaction between spiral projection 34 on spindle 35 and internal spiral grooves 33 in hollow cylinder 32, the longitudinal motion of such spindle is translated into a rotation of hollow cylinder 32 journaled in ball race 39.

The rotary motion of hollow cylinder 32 is transmitted through circular projection 40 and key 43 to contact arm 44 in contact with resistance 45. As the rotation of contact arm 44 changes the resistance in the electric circuit, the resulting change in current flow is immediately readable on indicator 53. Since the indicator is calibrated in terms of diameter, a direct reading of the tube diameter is obtained from the indicator 53, since current flow is a function of resistance, and resistance varies in response to change in tube diameter.

The example here given and the particular description set forth are merely presented in order to illustrate how the invention may be applied. Other forms and variations coming within the scope of the appended claims will readily suggest themselves to those skilled in the art.

We claim:

1. A tube gage, comprising a casing, an operating rod slidably disposed within said casing, a housing affixed to one end of said casing and having a channel extending transversely thereof, gage pins disposed within said channel and partially extending therefrom, means slidably connecting said gage pins and said operating rod and operable to retract said pins within said housing, spring means applying continuous pressure to said operating rod to urge said pins to their extended position, means for retracting said operating rod against the pressure of said spring means, a hollow cylinder having a plurality of internal spiral grooves formed therein rotatably positioned within said casing, a spindle associated with said operating rod and adapted to coact with said spiral grooves to rotate said cylinder within said casing, and means for indicating the extent of the rotary movement of said cylinder, comprising an electrical circuit including a resistance element, a contact arm affixed to said cylinder and adapted to contact said resistance element, a current-flow indicating means, and means for energizing said circuit.

2. A tube gage, comprising a casing having a slot formed in the wall thereof, a collar slidably mounted on the casing relative to said slot, an operating rod slidably disposed within said casing, means connecting said collar and said operating rod, a housing affixed to one end of said casing and having an aperture in one side wall thereof, diagonally crossed plungers rigidly affixed to said operating rod, gage pins positioned in a channel formed transversely in said housing each such pin having a slot formed adjacent the inner end slidably engaging a plunger and adapted to correlate the movement of the operating rod with the gage pin, spring means applying continuous pressure to said operating rod to urge said pins to their extended position, a hollow cylinder having a plurality of internal spiral grooves rotatably positioned within said casing, a spindle associated with said operating rod and adapted to coact with said spiral grooves to rotate said cylinder within said casing, and means for indicating the extent of the rotary movement of said cylinder, comprising an electrical circuit including a variable resistance, a contact arm affixed to said cylinder and adapted to contact said resistance element, a current-flow indicating means, and means for energizing said circuit.

3. A tube gage, comprising a casing, an operating rod positioned therein, a housing affixed to one end of said casing and having a channel extending transversely thereof, gage pins disposed within said channel and partially extending therefrom, means slidably connecting said gage pins and said operating rod and operable to retract said pins within said housing, spring means applying continuous pressure to said operating rod to urge said pins to their extended position, means for retracting said operating rod against the pressure of said spring means, a hollow cylinder having a plurality of internal spiral grooves rotatably positioned within said casing, a spindle associated with said operating rod and adapted to coact with said internal spiral grooves in said hollow cylinder to rotate said hollow cylinder within said casing, an electrical means, including a variable resistance and a contact means operatively associated with said hollow cylinder and with said variable resistance in a manner adapted to indicate the extent of said rotary movement of said hollow cylinder.

CHARLES H. WOODCOCK.
WILLIAM H. STINGER.

REFERENCES CITED

The following references are of record in the file of this patent:

UNITED STATES PATENTS

| Number | Name | Date |
| --- | --- | --- |
| 52,354 | Yeiser | Jan. 30, 1866 |
| 676,044 | Locke | June 11, 1901 |
| 1,449,271 | Elliott | Mar. 20, 1923 |
| 1,553,239 | Hauser | Sept. 8, 1925 |
| 1,562,923 | Sisson | Nov. 24, 1925 |
| 1,655,133 | Clase | Jan. 3, 1928 |
| 2,150,070 | Kregecz | Mar. 7, 1939 |
| 2,152,880 | Dowdy et al. | Apr. 4, 1939 |
| 2,267,110 | Kinley et al. | Dec. 23, 1941 |
| 2,316,877 | Maag | Apr. 20, 1943 |

FOREIGN PATENTS

| Number | Country | Date |
| --- | --- | --- |
| 512,091 | Great Britain | Aug. 29, 1939 |